J. H. STIRK.
SPLASH GUARD FOR WHEELS OF MOTOR VEHICLES.
APPLICATION FILED JAN. 19, 1920.
1,400,010.
Patented Dec. 13, 1921.
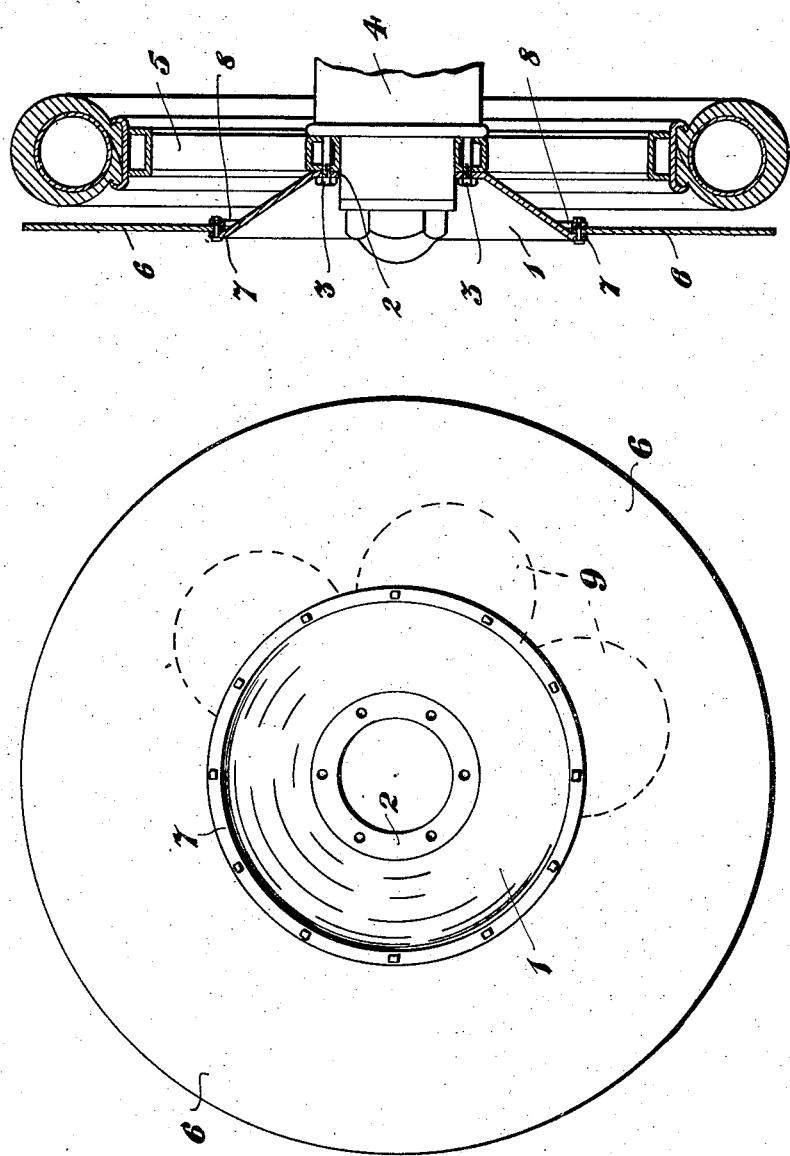

UNITED STATES PATENT OFFICE.

JOHN HARDACRE STIRK, OF GRAVELLY HILL, NEAR BIRMINGHAM, ENGLAND.

SPLASH-GUARD FOR WHEELS OF MOTOR-VEHICLES.

1,400,010.   Specification of Letters Patent.   Patented Dec. 13, 1921.

Application filed January 19, 1920. Serial No. 352,485.

*To all whom it may concern:*

Be it known that I, JOHN HARDACRE STIRK, a subject of the Kingdom of Great Britain, residing at "Cravendale," 34 Oval road, Gravelly Hill, near Birmingham, in the county of Warwick, England, traffic manager, have invented certain new and useful Improvements in Splash-Guards for Wheels of Motor-Vehicles, of which the following is a specification.

This invention relates to the type of splash guards which are attached to the outside face of the wheel, and consists of an annular dished metal plate having its central part bent to form an annular flange, the plane of which annular flange is parallel with the plane of the face of the spokes, and which metal plate carries around its outside an annular ring of sheet rubber or other flexible material, the whole being adapted to be attached to the wheel by the usual bolt attachments which secure the wheel to the hub or axle of the vehicle or by clips or bolt attachments used in connection with the spokes.

In order that this invention may be clearly understood and readily carried into practice, reference may be had to the appended explanatory sheet of drawings, upon which:—

Figure 1 is an elevation of a splash guard constructed according to one form of the present invention.

Fig. 2 is a transverse section illustrating the splash guard in position upon the wheel of a vehicle.

In the embodiment of this invention, an annular plate 1 is pressed out of sheet metal into dish formation, or is otherwise similarly constructed, the inner part of the annular dish being pressed to form or be provided with a ring flange 2 which is perforated in six or other number of places so that by simply removing the wheel attachment nuts 3, the perforations in the flange 2 can be readily engaged with the studs or bolts on the wheel hub 4 with which the detachable wheel 5 is engaged, and the guard or plate 1 concentrically positioned upon or against the wheel by the aforementioned nuts 3. With the device in position the conical wall projects away from the face of the wheel.

The inner edge of a ring of sheet rubber 6 is adapted to overlap the outer edge or external annular flange 7 of the dished plate 1, and to be secured to the latter by suitable rivets or bolts preferably with an outer ring of metal 8 to substantially secure the inner edge of the rubber ring 6 in position, the sheet rubber ring 6 being adapted to incline away from the tire toward its outer edge, which outer edge is adapted to approximately form contact with the ground at that point of the wheel which has its bearing on the road. Or if desired the flange 7 may be disposed in parallel relation to the flange 2, as illustrated, so that the rubber ring 6 is disposed in a plane parallel to that of the wheel 5.

The inside face of the ring flange 2 may be stiffened by an additional metal ring secured to the flange by riveting.

In the case of wheels having wood spokes, the ring flange 2 may be of slightly larger diameter and may be adapted to abut against the face of the spokes and be secured to the same either by staple bolts which are passed around the spokes from the inner face of the wheel and secured by screw nuts, or by substantially spring clips which are secured to the inside of the flange, which spring clips are adapted to clip three, four, or more of the spokes.

In the case of wheels having wire spokes, a metal band ring made in two or more sections is adapted to abut against the face of the spokes on the inner side of the ring, said band ring having a series of bolts which pass through the spokes and are adapted to receive the ring flange on the metal dish of the guard, in such a manner that the spokes are tightly clamped between the ring at the one side of the wheel and the flange ring on the mud-guard on the front face of the wheel.

In any of the foregoing arrangements, radially projecting tongues 9 may be provided upon the outer edge of the annular disk 1 to steady or lend support to the flexible ring or sheet rubber or other flexible material 6.

What I claim as my invention and desire to secure by Letters Patent is:

A splash guard for the wheels of motor vehicles, comprising an annular plate arranged to be secured to the wheel, an annular sheet of flexible material secured to the periphery of said plate and projecting tongues of substantially semicircular form rigidly attached upon the outer periphery of the said annular plate, said tongues being arranged to bear flatwise against the said annular sheet of flexible material to lend support to the same.

In witness whereof I have hereunto set my hand.

JOHN HARDACRE STIRK.